United States Patent
El Nahas El Homsi et al.

(10) Patent No.: US 7,167,529 B2
(45) Date of Patent: Jan. 23, 2007

(54) METHOD AND DEVICE FOR RADIO SIGNAL RECEPTION

(75) Inventors: Hassan El Nahas El Homsi, Paris (FR); Alexandre Jard, Paris (FR); Moussa Abdi, Paris (FR)

(73) Assignee: Nortel Networks Limited, St. Laurent (CA)

(*) Notice: Subject to any disclaimer, the term of this patent is extended or adjusted under 35 U.S.C. 154(b) by 803 days.

(21) Appl. No.: 10/312,058

(22) PCT Filed: Jun. 20, 2001

(86) PCT No.: PCT/FR01/01934

§ 371 (c)(1),
(2), (4) Date: Dec. 20, 2002

(87) PCT Pub. No.: WO01/99301

PCT Pub. Date: Dec. 27, 2001

(65) Prior Publication Data

US 2003/0091100 A1 May 15, 2003

(30) Foreign Application Priority Data

Jun. 22, 2000 (FR) .................................. 00 08008

(51) Int. Cl.
*H03K 9/00* (2006.01)
*H04L 1/00* (2006.01)

(52) U.S. Cl. ........................................ 375/316; 375/346

(58) Field of Classification Search ............... 375/316, 375/346, 347, 348, 349, 147, 148
See application file for complete search history.

(56) References Cited

U.S. PATENT DOCUMENTS 6,498,804 B1 * 12/2002 Ide et al. .................... 375/144

(Continued)

FOREIGN PATENT DOCUMENTS

| EP | 0 964 530 | 12/1999 |
|----|-----------|---------|
| EP | 0 986 204 | 3/2000 |

OTHER PUBLICATIONS

Hui, et al., "Successive Interference Cancellation for Multiuser Asynchronous DS/CDMA Detectors in Multipath Fading Links", IEEE Transactions on Communications, IEEE Inc. New York, US, vol. 46, No. 3, Mar. 1, 1998, pp. 384-391.

*Primary Examiner*—Chieh M. Fan
*Assistant Examiner*—Jason M. Perilla
(74) *Attorney, Agent, or Firm*—Trop, Pruner & Hu, PC (57) ABSTRACT

The received radio signal includes contributions from a plurality of channels multiplexed by respective spreading codes. A matched filter receiver is allocated to each multiplexed channel to estimate an impulse response of the channel and to provide first soft estimates of symbols transmitted on the channel. The first soft estimates provided by the matched filter receivers are processed to obtain a corrected soft estimate of at least one symbol transmitted on a channel. That processing includes subtracting from the first soft estimate of the symbol at least one term equal to the product of a decision value assigned to another symbol transmitted on another channel, determined from a soft estimate obtained previously for said other transmitted symbol, and a correlation between two generalized codes associated respectively with said symbol and with said other symbol. The generalized code associated with a symbol transmitted on a channel is a convolution of the estimated impulse response of said channel and Q samples of the spreading code of the channel which correspond to said symbol.

18 Claims, 2 Drawing Sheets

U.S. PATENT DOCUMENTS 6,570,864 B1 * 5/2003 Kim et al. .................. 370/342
6,882,678 B2 * 4/2005 Kong et al. ................. 375/144
6,931,050 B1 * 8/2005 Bottomley ................. 375/130
2002/0067761 A1 * 6/2002 Kong et al. ................. 375/148
2003/0043893 A1 * 3/2003 Jard et al. .................. 375/152
2004/0223537 A1 * 11/2004 Abdi et al. ................. 375/147

* cited by examiner

METHOD AND DEVICE FOR RADIO SIGNAL RECEPTION

BACKGROUND OF THE INVENTION

The present invention relates to digital radio communication techniques using Code Division Multiple Access (CDMA).

It is more especially aimed at multi-user detection procedures which are sometimes employed in these techniques to improve the reception performance.

A CDMA signal processed by a receiver can be expressed, after filtering and transposition to baseband, as follows:

$$y(t) = \sum_{u=1}^{U} y^u(t) + n(t) \quad (1)$$

where n(t) is additive noise and U is the number of channels multiplexed on the CDMA carrier, the general expression for whose contributions $y^u(t)$ is:

$$y^u(t) = \sum_{i} b_i^u \cdot s_i^u(t - iT) \quad (2)$$

where:
- $b_i^u$ is the information symbol of rank i transmitted on the u-th channel;
- $s_i^u(t)$ is a generalized code given by the convolution of the impulse response of the u-th channel with the portion corresponding to the symbol $b_i^u$ of the spreading code $c^u$ assigned to the channel.

The number U corresponds to the number of users if each user involved utilizes a single channel. There may however be several channels per user (for example traffic and control).

The spreading codes $c^u$ are sequences of discrete samples called "chips", with real values (±1) or complex values (±1±j), having a given chip rate. The symbols $b_i^u$ also have real values (±1) or complex values (±1±j). The duration of a symbol on a channel is a multiple of the chip duration, the ratio between the two being the spreading factor Q of the channel.

In certain systems, the spreading factor may vary from one channel to another. In such a case, a common spreading factor Q is considered, equal to the greatest common divisor (GCD) of the U spreading factors $Q^u$. A symbol on the channel u is then regarded as the concatenation of $Q^u/Q$ consecutive symbols $b_i^u$ whose values are identical.

The duration of the generalized response $s_i^u(t)$ corresponds to Q+W−1 chips if W denotes the length of the impulse response expressed as a number of chips.

By sampling at the chip rate the CDMA signal y(t) received for a block of n symbols on each of the channels, the receiver obtains complex samples that can be modeled by a vector Y of n×Q+W−1 components:

$$Y = A \cdot b + N \quad (3)$$

where:
- b denotes a column vector of size n×U, which can be decomposed into $b^T = (b_1^T, b_2^T, \ldots, b_n^T)$, $(.)^T$ representing the transposition operation, the vectors $b_i$ being of size U for $1 \leq i \leq n$, with $b_i^T = (b_i^1, b_i^2, \ldots, b_i^U)$;
- N is a random noise vector of size n×Q+W−1;
- $A = (A_1, A_2, \ldots, A_n)$ is a matrix of generalized codes of size (n×Q+W−1)×(n×U) which can be subdivided into n submatrices $A_i$ of size (n×Q+W−1)×U. In the matrix $A_i$ ($1 \leq i \leq n$), the u-th column ($1 \leq u \leq U$) is a convolution of the impulse response of the u-th channel and of the Q samples of the spreading code of the u-th channel corresponding to the i-th symbol of the block.

Stated otherwise, the matrices $A_i$ may be written:

$$A_i = (\Omega_i^1, \Omega_i^2, \ldots, \Omega_i^U) \quad (4)$$

with: $\Omega_i^u = M_i^u \cdot H_i^u \quad (5)$ where $M_i^u$ is a Toeplitz matrix of size (n×Q+W−1)×(n×Q+W−Q) obtained from the values $c_i^u(q)$ of the chips of the spreading code $c^u$ of the u-th channel over the duration of the i-th bit of the block:

$$M_i^u = \begin{pmatrix} c_i^u(1) & 0 & \cdots & 0 \\ c_i^u(2) & c_i^u(1) & \ddots & \vdots \\ & c_i^u(2) & \ddots & 0 \\ c_i^u(Q) & & \ddots & c_i^u(1) \\ 0 & c_i^u(Q) & & c_i^u(2) \\ \vdots & & \ddots & \vdots \\ 0 & \cdots & 0 & c_i^u(Q) \end{pmatrix} \quad (6)$$

and $H_i^u$ is a column vector of size (n−1)×Q+W which, when the U channels are received synchronously, contains (i−1)×Q zeroes, followed by the W samples of the impulse response of the u-th channel relating to the i-th symbol $b_i^u$, and followed by (n−i)×Q other zeroes. The time offsets in reception along the various channels, in numbers of chips, result in corresponding offsets of the W samples of the impulse response of the channels along the vector $H_i^u$.

The most commonly used receiver uses one or more matched filters to estimate the value of the symbols transmitted on each channel. This receiver estimates the impulse response of the channel along a propagation path or several propagation paths ("rake receiver").

The operation performed by such receivers amounts to performing the matrix product:

$$Z = \hat{A}^* \cdot Y \quad (7)$$

where $\hat{A}^*$ is the conjugate transpose of an estimate $\hat{A} = (\hat{A}_1, \hat{A}_2, \ldots, \hat{A}_n)$ of the matrix $A = (A_1, A_2, \ldots, A_n)$, the matrices $\hat{A}_i$ stemming from the impulse responses estimated by applying relations (4) and (5).

The n×U components $Z_i^u$ of the vector Z are respective soft estimates of the n×U symbols $b_i^u$ of the vector b. If the decoding operations performed downstream admit soft estimates as input, the components of the vector Z can be used directly. Otherwise, the sign of these components is taken to form the hard estimates of the symbols.

The matched filter receiver is optimal when the generalized codes (vectors $\Omega_i^u$) are pairwise orthogonal, i.e. when the matrix $A^* \cdot A$ is diagonal. In general, the systems adopt pairwise orthogonal spreading codes having good autocorrelation properties, this making it possible to satisfy this condition to a first approximation.

However, when the impulse response of the channel is taken into account, the orthogonality condition is no longer fulfilled. The above approximation becomes poor especially in the presence of multiple propagation paths.

An object of the present invention is to compensate for the non-optimal nature of the receiver with matched filter in these situations.

SUMMARY OF THE INVENTION

The invention thus proposes a method of receiving a radio signal comprising contributions from a plurality of channels multiplexed by respective spreading codes, wherein a matched filter receiver is allocated to each multiplexed channel to estimate an impulse response of the channel and to provide first soft estimates of symbols transmitted on the channel. According to the invention, the first soft estimates provided by the matched filter receivers are processed to obtain a corrected soft estimate of at least one symbol transmitted on a channel by subtracting from the first soft estimate of said symbol at least one term equal to the product of a decision value assigned to another symbol transmitted on another channel, determined from a soft estimate obtained previously for said other transmitted symbol, and a correlation between two generalized codes associated respectively with said symbol and with said other symbol, the generalized code associated with a symbol transmitted on a channel being a convolution of the estimated impulse response of said channel and Q samples of the spreading code of the channel which correspond to said symbol.

The method corrects the soft estimates provided by the matched filter receiver by making allowance for the particular form of the interference caused in a channel by the presence of the other multiple access channels. This interference is here called MAI ("multiple access interference"). This allowance improves the performance of the receiver in terms of signal-to-noise ratio.

The symbols are typically transmitted on U multiplexed channels in the form of respective blocks of n symbols, n and U being numbers greater than 1. At the output of the matched filter receivers, the first soft estimate of the i-th symbol of a block transmitted on the u-th channel ($1 \leq i \leq n$, $1 \leq u \leq U$) is given by the ((i−1)×U+u)-th component of a vector $Z = \hat{A}^* \cdot Y$, where Y is a vector of size nxQ+W−1 composed of complex samples of a baseband signal obtained from the received radio signal, Q is the number of samples per symbol in the spreading codes, W is the number of samples in the estimates of the impulse responses, and $\hat{A}^*$ is the conjugate transpose of a matrix $\hat{A} = (\hat{A}_1, \hat{A}_2, \ldots, \hat{A}_n)$ subdivided into n submatrices $\hat{A}_i$ of size (nxQ+W−1)×U with $1 \leq i \leq n$, the u-th column of the matrix $\hat{A}_i$ for $1 \leq u \leq U$ being a convolution of the estimated impulse response of the u-th channel and of the Q samples of the spreading code of the u-th channel corresponding to the i-th symbol of the block. The corrected soft estimate of at least one i-th symbol of a block transmitted on a u-th channel ($1 \leq i \leq n$, $1 \leq u \leq U$) may then be obtained by subtracting from the first soft estimate of said symbol at least one term given by $\tilde{R}_{i,0}^u \cdot \hat{b}_i$, where $\tilde{R}_{i,0}^u$ is the u-th row of a matrix of size UxU whose diagonal components are zero and whose other components are respectively from a correlation matrix $\hat{R}_{i,0} = \hat{A}_i^* \cdot \hat{A}_i$, and $\hat{b}_i$ is a column vector of size U composed of decision values assigned to the i-th symbols of the U blocks, determined respectively from soft estimates obtained previously for said i-th symbols.

The term $\tilde{R}_{i,0}^u \cdot \hat{b}_i$ represents, to a first approximation, an estimate of the interference caused in the u-th channel by the presence of the U−1 other channels. This approximation may suffice in cases where the inter-symbol interference (ISI) is weak.

The row vector $\tilde{R}_{i,0}^u$ is neglected in traditional receivers (which assume that $\hat{A}^* \cdot \hat{A}$ is diagonal), so that the MAI is regarded as included in the additive noise (vector N of relation (3)). This degrades the performance of the receiver in terms of signal-to-noise ratio.

The above method exploits knowledge which may be obtained regarding the structure of the contributions from the MAI in the signal received, so as to avoid or at least attenuate this degradation.

In an advantageous implementation of the method, said corrected soft estimate of the i-th symbol of the block transmitted on the u-th channel is obtained by further subtracting from the first soft estimate of said symbol at least one term of the form $\hat{R}_{i,j}^u \cdot \hat{b}_{i+j}$, where j is a non-zero integer, and $\hat{R}_{i,j}^u$ is the u-th row of a matrix of size UxU whose components are respectively from a correlation matrix $\hat{R}_{i,j} = \hat{A}_i^* \cdot \hat{A}_{i+j}$. Preferably, each of the terms of the form $\hat{R}_{i,j}^u \cdot \hat{b}_{i+j}$ for $-m \leq j \leq -1$ and $1 \leq j \leq m$ is subtracted from the first soft estimate of said symbol to obtain its corrected soft estimate, m being the integer equal to or immediately greater than the number (Q+W−1)/Q.

The estimate of the contribution from the MAI is thus sharpened and the inter-symbol interference (ISI), whose integer m represents the degree, is taken into account in the same way.

Typically, the corrected soft estimates will be determined sequentially for a plurality of symbols of the U blocks. To form said soft estimates obtained previously for certain of the symbols, serving to determine the decision values, one then advantageously takes the corrected soft estimates of said symbols if the former have previously been determined, and the first soft estimates of said symbols otherwise. The corrections already performed on the soft estimates are thus taken into account recursively, this making it possible to further improve accuracy.

Another aspect of the present invention pertains to a device for receiving a radio signal comprising contributions from a plurality of channels multiplexed by respective spreading codes, comprising matched filter receivers each allocated to a respective multiplexed channel to estimate an impulse response of the channel and to provide first soft estimates of symbols transmitted on the channel, and means for processing these first soft estimates provided by the matched filter receivers to obtain a corrected soft estimate of at least one symbol transmitted on a channel in the manner indicated above.

Such a device can in particular be incorporated into a base station of a CDMA radio communication system.

DESCRIPTION OF PREFERRED EMBODIMENTS

Figure 1:
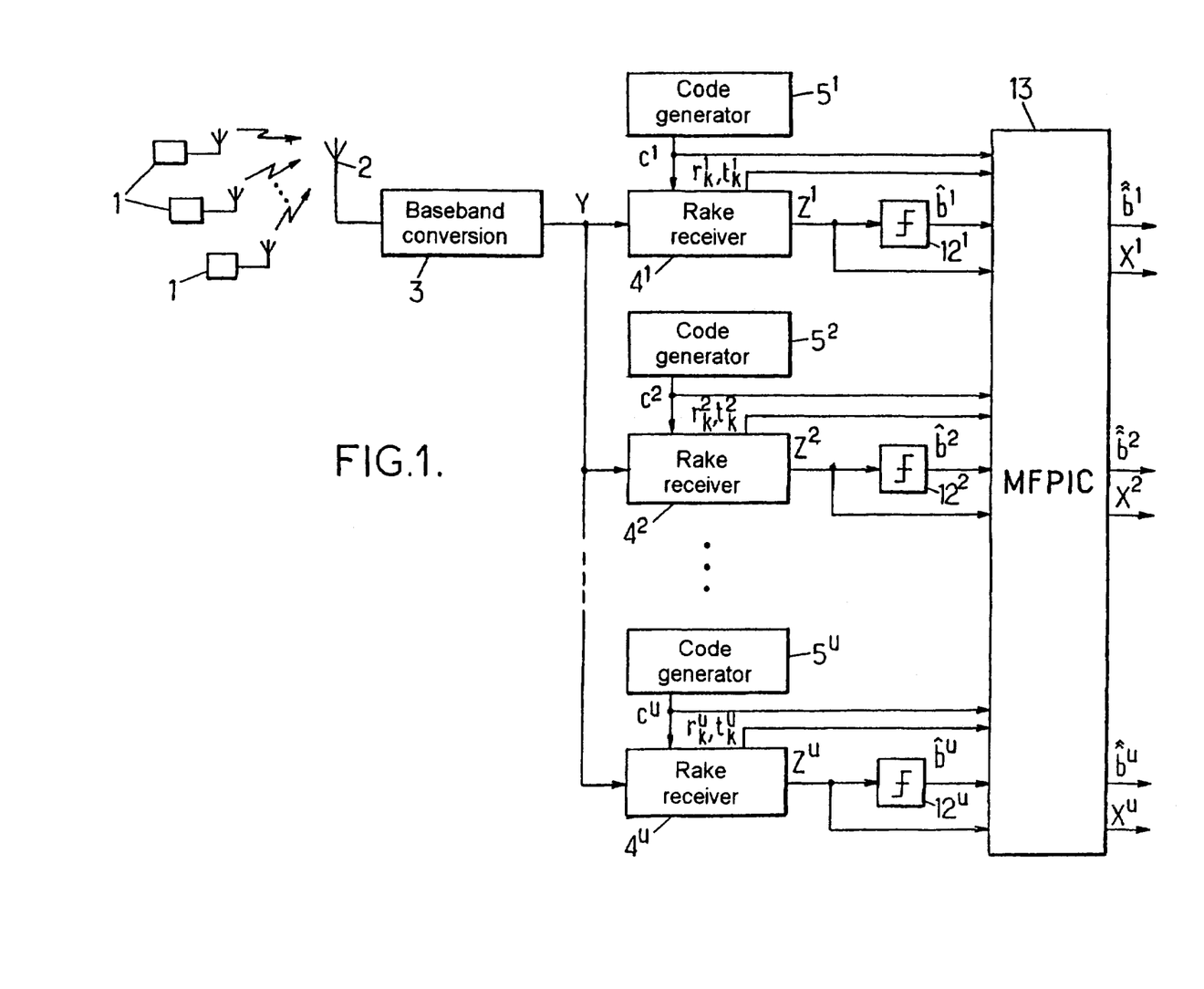
FIG. 1 is a schematic diagram of a receiving device according to the invention.

The device represented in FIG. 1 forms part of the receiving stage of a radio communication station able to communicate with several remote stations 1.

The uplink channels used by these distant stations 1 are multiplexed by the CDMA technique, so that the radio signal picked up by the antenna 2, and converted to baseband, can be represented in the form (1)–(2) for U multiplexed channels originating from V stations ($1 \leq V \leq U$).

The station incorporating the device is for example a base station of a third-generation cellular radio communication system of the UMTS ("Universal Mobile Telecommunication System") type.

In FIG. 1, the unit 3 diagrammatically represents the modules performing in a conventional manner the signal reception preprocessing (amplification, filterings, conversion to baseband, chip rate sampling). This unit 3 delivers blocks Y of n×Q+W−1 samples, corresponding to blocks of n symbols transmitted simultaneously on the U channels. If the blocks of n symbols follow one another without interruption on the channels, there is an overlap of W samples (chips) between the successive blocks Y, corresponding to the duration of the impulse response.

The received-signal blocks Y are provided in parallel to U matched filter receivers $4^u$ operating with respective channel codes $c^u$ produced by pseudorandom code generators $5^u$ ($1 \leq u \leq U$).

Figure 2:
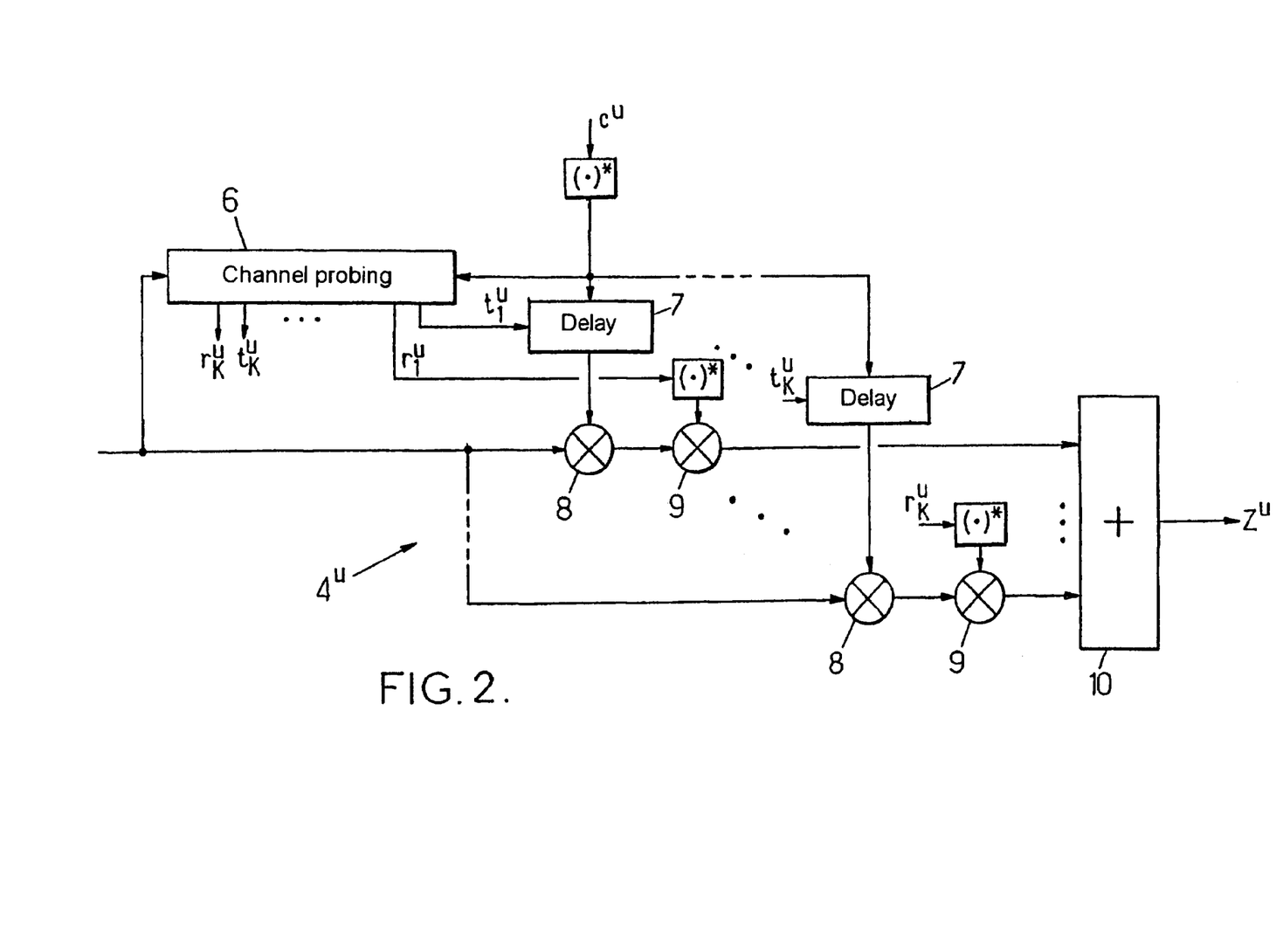
FIG. 2 is a diagram of a matched filter receiver of the device.

FIG. 2 illustrates the well-known structure of a matched filter receiver $4^u$ of "rake" type.

This receiver $4^u$ comprises a channel probing unit 6 which evaluates the impulse response of the u-th channel by searching for K propagation paths ($K \geq 1$), for the K "fingers" of the receiver. Each path K is characterized by a delay $t_k^u$ expressed as a number of chips and a complex response $r_k^u$ ($1 \leq k \leq K$). By way of example, the signal transmitted on each channel by a remote station may comprise sequences of known training symbols. By searching, over a window of length W chips, for the K correlations of largest amplitude between the received signal Y and these known sequences modulated by the channel spreading code $c^u$, the unit 6 obtains the delays $t_k^u$ (time offsets of the maxima) and the responses $r_k^u$ (values of the maxima).

In each finger k of the receiver $4^u$, the spreading code $c^u$ produced by the generator $5^u$ (or its conjugate if the codes are complex) is delayed by a unit 7 which applies the delay of $t_k^u$ chips thereto. Each code thus delayed is multiplied by the received signal Y (multiplier 8) and by the conjugate of the complex response $r_k^u$ (multiplier 9). The K results of these multiplications are summed by an adder 10 to form the block $Z^u$ of n soft estimates for the u-th channel. At the output of the matched filter receiver $4^u$, the i-th component of the block $Z^u$ is the soft estimate of the symbol $b_i^u$. If the symbols $b_i^u$ are signed bits (±1), the soft estimates of the block $Z^u$ are the real parts of the summed contributions of the K fingers. If the symbols $b_i^u$ are pairs of signed bits, they are complex numbers equal to these summed contributions.

As shown in FIG. 1, the soft estimates $Z^u$ can be transformed into hard estimates $\hat{b}^u$ by decision modules $12^u$ at the output of the receivers $4^u$. When the symbols $b_i^u$ are signed bits, the modules $12^u$ simply apply the sign function to the real components of the vectors $Z^u$. When these are pairs of signed bits, the modules $12^u$ apply the sign function to the real parts and to the imaginary parts of the components of the vectors $Z^u$.

If the set of components of the U vectors $Z^u$ is ordered by grouping together the estimates of the symbols of like rank i, then the vector Z defined above of size n×U is obtained, in which the soft estimate of the symbol $b_i^u$ is the ((i−1)×U+u)-th component. The column vector Z can also be decomposed into n vectors $Z_i$ of size U, according to $Z^T = (Z_1^T, Z_2^T, \ldots, Z_n^T)$. A similar ordering of the components of the U vectors $\hat{b}^u$ gives the column vector of hard estimates $\hat{b}$ of size n×U, which can be decomposed into $\hat{b}^T = (\hat{b}_1^T, \hat{b}_2^T, \ldots, \hat{b}_n^T)$, the vectors $\hat{b}_i$ being of size U for $1 \leq i \leq n$ and representing respective estimates of the vectors $b_i$.

The matrix product (7) performed by the matched filter receivers can also be written (cf. (3)):

$$Z = \hat{A}^* \cdot A \cdot b + \hat{A}^* \cdot N \tag{8}$$

If we assume that the impulse responses have been estimated correctly, then the matrices A and $\hat{A}$ may be regarded as equal, and we see that the relation between the vector b of the symbols and the vector Z of the soft estimates of these symbols is characterized by the matrix $A^* \cdot A$, which can be expanded as:

$$A^* \cdot A = \begin{pmatrix} R_{1,0} & R_{1,+1} & \cdots & R_{1,+m} & 0 & \cdots & 0 \\ R_{2,-1} & R_{2,0} & & & \ddots & \ddots & \vdots \\ \vdots & & \ddots & & & \ddots & 0 \\ R_{m+1,-m} & & & \ddots & \ddots & & R_{n-m,+m} \\ 0 & \ddots & & & \ddots & \ddots & \vdots \\ \vdots & & \ddots & \ddots & & R_{n-1,0} & R_{n-1,+1} \\ 0 & \cdots & 0 & R_{n,-m} & \cdots & R_{n,-1} & R_{n,0} \end{pmatrix} \tag{9}$$

with, for $1 \leq i \leq n$ and $-m \leq j \leq +m$:

$$R_{i,j} = R_{i+j,-j}^* = A_i^* \cdot A_{i+j} \tag{10}$$

Each matrix $R_{i,j}$ of size U×U contains the correlations of the generalized codes between the i-th symbols and the (i+j)-th symbols of the blocks relating to the U channels.

For $1 \leq i \leq n$, equation (8) reduces to:

$$Z_i = \sum_{j=-m}^{+m} R_{i,j} \cdot b_{i+j} + N_i \tag{11}$$

where $Z_i$ is a vector of size U containing the soft estimates of the i-th symbols of the U blocks and $N_i$ a corresponding noise vector.

In the particular case where all the channels are synchronized and where the ISI is negligible (m=0), a simplification arises:

$$Z_i = R_{i,0} \cdot b_i + N_i \tag{12}$$

The method according to the invention comprises a postprocessing of the soft estimates of the vectors $Z_i$, which is carried out in the module 13 represented in FIG. 1. The algorithm used is called MFPIC ("Matched Filter Parallel Interference Cancellation").

The first step of this algorithm consists in obtaining, for $1 \leq i \leq n$ and $-m \leq j \leq +m$, the components of the matrices $\hat{R}_{i,j} = \hat{A}_i^* \cdot \hat{A}_{i+j}$ which are the estimates of the correlation matrices $R_{i,j}$ based on the impulse responses estimated by the probing units 6. Relations (10) show that the required quantity of calculations can be reduced by virtue of the symmetry properties of the matrices $R_{i,j}$.

Each component $\hat{R}_{i,j}^{u,v} = \hat{\Omega}_i^{u*} \cdot \hat{\Omega}_{i+j}^v$ of a matrix $\hat{R}_{i,j}$ is the scalar product of two vectors $\hat{\Omega}_i^u$ and $\hat{\Omega}_{i+j}^v$ corresponding to the columns u and v of the matrices $\hat{A}_i$ and $\hat{A}_{i+j}$. Each vector $\hat{\Omega}_i^u$ contains the convolution of the estimated impulse response of channel u and of the Q samples of the spreading code of this channel corresponding to the i-th symbol of the block, and is defined as in relation (5), the matrix $M_i^u$ being determined according to (6) in accordance with the code $c^u$ provided by the generator $5^u$, and the vector $H_i^u$ being replaced by an estimated response vector $\hat{H}_i^u$ containing the complex responses $r_k^u$ estimated by the probing units 6, positioned according to the corresponding delays $t_k^u$.

According to one implementation of the invention, the module 13 executes the following operation (13) sequentially for i going from 1 to n:

$$X_i = Z_i - \tilde{R}_{i,0} \cdot \hat{b}_i - \sum_{j=1}^{m} (\hat{R}_{i,-j} \cdot \hat{b}_{i-j} + \hat{R}_{i,j} \cdot \hat{b}_{i+j}) \quad (13)$$

i.e. for each symbol:

$$X_i^u = Z_i^u - \tilde{R}_{i,0}^u \cdot \hat{b}_i - \sum_{j=1}^{m} (\hat{R}_{i,-j}^u \cdot \hat{b}_{i-j} + \hat{R}_{i,j}^u \cdot \hat{b}_{i+j})$$

where the matrix $\tilde{R}_{i,0}$ is equal to the correlation matrix $\hat{R}_{i,0}$ in which the diagonal components are set to zero. In general the block of n symbols is preceded and followed by other symbols, whose hard estimates are placed in the vectors $\hat{b}_{i-j}$ for $i-j \leq 1$ and $\hat{b}_{i+j}$ for $i+j>n$. Otherwise, these vectors may be set to zero.

The vectors $X_i$ thus obtained are corrected soft estimates taking account of relations (11). This correction exploits the decisions taken in the hard estimates $\hat{b}_i$, and hence a certain structure of the MAI and of the ISI, which is not the same as that of the Gaussian noise N.

Additional hard estimates $\hat{b}_i$ may in their turn be deduced from the soft estimates $X_i$, typically by applying the sign function to the real components (where the symbols are bits) or to each of the real and imaginary parts of the complex components (where the symbols are pairs of bits): $\hat{b} = \text{sign}[X_i]$.

At the output of the post-processing module 13, the soft estimates of the vectors $X_i$ and/or the hard estimates of the vectors $\hat{b}_i$ ($1 \leq i \leq n$) are redistributed among the U channels, as indicated by the vectors $X^u$ and $\hat{b}^u$ in FIG. 1 ($1 \leq u \leq U$), so as to provide the estimates useful to the decoders in the downstream channel processing pathways.

In a preferred variant of the invention, the module 13 executes the following operations (13) and (14) sequentially for i going from 1 to n:

$$X_i = Z_i - \tilde{R}_{i,0} \cdot \hat{b}_i - \sum_{j=1}^{m} (\hat{R}_{i,-j} \cdot \hat{b}_{i-j} + \hat{R}_{i,j} \cdot \hat{b}_{i+j}) \quad (13)$$

$$\hat{b}_i = \text{sign}[X_i] \quad (14)$$

In this case, the corrected estimates $X_i$ which have already been calculated are taken into account recursively in the decision taken in the operation (14), thereby further improving the estimates.

It should be noted that the operations (13) and (14) above could be executed in an order other than that of increasing indices i. For example, they could be executed in an order determined by an energy criterion. One possibility is first to correct the estimates of the symbols of least energy in the signal received, that is to say to proceed in the order of the indices i for which the diagonal terms of the correlation matrix $\hat{R}_{i,0}$ are decreasing.

In other alternative embodiments:

the function applied (in the decision modules 12$^u$) to deduce from the soft estimates $Z_i$ the estimates $\hat{b}_i$ used in formula (13) is, rather than the sign function, a function generally increasing between −1 and +1. For example, a function with three values (−1 for $Z_i^u<-T$, 0 for $-T \leq Z_i^u \leq +T$ and +1 for $Z_i^u>+T$) makes it possible to do away with making corrections based on estimates with low likelihood relative to a threshold T. The function can also increase continuously from −1 to +1. The advantage of the sign function is mainly in terms of complexity since it avoids the multiplications in formula (13);

likewise, a function increasing between −1 and +1 can generally be used in the operation (14) to obtain the estimate $\hat{b}_i$ used in the following iterations of operation (13);

the MFPIC algorithm is applied to only some of the channels received, this amounting to taking, in the expression for the algorithm, a value of U (>1) which is smaller than the number of rake receivers. Here again, energy criteria can govern which channels are subjected to the correction of MAI;

the MFPIC algorithm is applied in a station receiving in diversity mode with the aid of d distinct antennas (or antenna sectors). It is then sufficient to replace $A^* \cdot A$ by $$\sum_{p=1}^{d} A^*(p) \cdot A(p) \text{ and } A^* \cdot Y \text{ by } \sum_{p=1}^{d} A^*(p) \cdot Y(p)$$

in the expression for the algorithm, the index p referring to the various antennas.

The MFPIC algorithm offers multi-user detection having good performance, especially in respect of the relatively low spreading factors Q. As soon as the binary error rate is less than 15%, it affords a significant gain in terms of signal-to-noise ratio, as compared with the simple rake receiver. Its limitations seem to come only from the uncertainties in the estimates of the impulse responses of the channels.

The invention claimed is:

1. A method of receiving a radio signal comprising contributions from a plurality of channels multiplexed by respective spreading codes, comprising the steps of:

allocating a matched filter receiver to each multiplexed channel to estimate an impulse response of each channel and to provide first soft estimates of symbols transmitted on each channel; and processing the first soft estimates provided by the matched filter receivers to obtain a corrected soft estimate of at least one symbol transmitted on one of the multiplexed channels by subtracting from the first soft estimate of said at least one symbol at least one term equal to the product of a decision value assigned to another symbol transmitted on another one of the multiplexed channels, determined from a soft estimate obtained previously for said another symbol, and a correlation between two generalized codes associated respectively with said at least one symbol and with said another symbol, each generalized code being a convolution of an estimated impulse response of its associated multiplexed channel and Q samples of a spreading code of said associated multiplexed channel where Q is a number of chips per symbol in the spreading codes.

2. The method as claimed in claim 1, wherein symbols are transmitted on U multiplexed channels in the form of respective blocks of n symbols, n and U being numbers greater than 1, wherein, at the output of the matched filter receivers, the first soft estimate of the i-th symbol of a block transmitted on the u-th channel ($1 \leq i \leq n$, $1 \leq u \leq U$) is given by the $((i-1) \times U + u)$-th component of a vector $Z = \hat{A}^* \cdot Y$, where Y is a vector of size $n \times Q + W - 1$ composed of complex samples of a baseband signal obtained from the received radio signal, W is a number of samples in the estimates of the impulse responses, and $\hat{A}^*$ is the conjugate transpose of a matrix $\hat{A} = (\hat{A}_1, \hat{A}_2, \ldots, \hat{A}_n)$ subdivided into n submatrices $\hat{A}_i$ of size $(n \times Q + W - 1) \times U$ with $1 \leq i \leq n$, a u-th column of the matrix $\hat{A}_i$ for $1 \leq u \leq U$ being a convolution of the estimated impulse response of the u-th channel and of the Q samples of a spreading code of the u-th channel corresponding to the i-th symbol of a block, and wherein a corrected soft estimate of at least an i-th symbol of a block transmitted on a u-th channel ($1 \leq i \leq n$, $1 \leq u \leq U$) is obtained by subtracting from a first soft estimate of said i-th symbol at least one term given by $\tilde{R}^u_{i,0} \cdot \hat{b}_i$, where $\tilde{R}^u_{i,0}$ is the u-th row of a matrix of size $U \times U$ whose diagonal components are zero and whose other components are respectively from a correlation matrix $\hat{R}_{i,0} = \hat{A}_i^* \cdot \hat{A}_i$, and $\hat{b}_i$ is a column vector of size U composed of decision values assigned to the i-th symbols of the U blocks, determined respectively from soft estimates obtained previously for said i-th symbols.

3. The method as claimed in claim 2, wherein said corrected soft estimate of the i-th symbol of the block transmitted on the u-th channel is obtained by further subtracting from the first soft estimate of said i-th symbol at least one term of the form $\hat{R}^u_{i,j} \cdot \hat{b}_{i+j}$, where j is a non-zero integer, and $\hat{R}^u_{i,j}$ is the u-th row of a matrix of size $U \times U$ whose components are respectively from a correlation matrix $\hat{R}_{i,j} = \hat{A}_i^* \cdot \hat{A}_{i+j}$.

4. The method as claimed in claim 3, wherein said corrected soft estimate of the i-th symbol of the block transmitted on the u-th channel is obtained by subtracting from the first soft estimate of said i-th symbol each of the terms of the form $\hat{R}^u_{i,j} \cdot \hat{b}_{i+j}$ for $-m \leq j \leq -1$ and $1 \leq j \leq m$, where m is the integer equal to or immediately greater than the number $(Q+W-1)/Q$.

5. The method as claimed in claim 1, wherein corrected soft estimates are obtained sequentially for a plurality of symbols blocks, and wherein each decision value assigned to a symbol transmitted on a multiplexed channel is determined either from the first soft estimate of said symbol, if a corrected soft estimate of said symbol has not been obtained, or from the corrected soft estimate of said symbol.

6. The method as claimed in claim 1, wherein the symbols are bits, the soft estimates are real numbers, and the decision values are determined from soft estimates obtained previously by applying a function increasing between −1 and +1 to said soft estimates.

7. The method as claimed in claim 1, wherein the symbols are bit pairs, the soft estimates are complex numbers, and the decision values are determined from the soft estimates obtained previously by applying a function increasing between −1 and +1 to real and imaginary parts of said soft estimates.

8. The method as claimed in claim 7, wherein said function increasing between −1 and +1 is the sign function.

9. A device for receiving a radio signal comprising contributions from a plurality of channels multiplexed by respective spreading codes, the receiving device comprising matched filter receivers each allocated to a respective multiplexed channel to estimate an impulse response of each channel and to provide first soft estimates of symbols transmitted on each channel, and means for processing the first soft estimates provided by the matched filter receivers to obtain a corrected soft estimate of at least one symbol transmitted on one of the multiplexed channels by subtracting from the first soft estimate of said at least one symbol at least one term equal to the product of a decision value assigned to another symbol transmitted on another one of the multiplexed channels, determined from a soft estimate obtained previously for said another symbol, and a correlation between two generalized codes associated respectively with said symbol and with said another symbol, each generalized code being a convolution of an estimated impulse response of a multiplexed channel and Q samples of a spreading code of the multiplexed channel, where Q is a number of chips per symbol in the spreading codes.

10. The receiving device as claimed in claim 9, comprising at least U matched filter receivers each assigned to a respective multiplexed channel to estimate an impulse response of the channel and to obtain first soft estimates of a block of n symbols transmitted on the channel, n and U being numbers greater than 1, wherein, at the output of the matched filter receivers, the first soft estimate of the i-th symbol of a block transmitted on the u-th channel ($1 \leq i \leq n$, $1 \leq u \leq U$) is given by the $((i-1) \times U + u)$-th component of a vector $Z = \hat{A}^* \cdot Y$, where Y is a vector of size $n \times Q + W - 1$ composed of complex samples of a baseband signal obtained from the received radio signal, W is a number of samples in the estimates of the impulse responses, and $\hat{A}^*$ is the conjugate transpose of a matrix $\hat{A} = (\hat{A}_1, \hat{A}_2, \ldots, \hat{A}_n)$ subdivided into n submatrices $\hat{A}_i$ of size $(n \times Q + W - 1) \times U$ with $1 \leq i \leq n$, a u-th column of the matrix $\hat{A}_i$ for $1 \leq u \leq U$ being a convolution of the estimated impulse response of the u-th channel and of the Q samples of a spreading code of the u-th channel corresponding to the i-th symbol of the block, and wherein a corrected soft estimate of at least an i-th symbol of a block transmitted on a u-th channel ($1 \leq i \leq n$, $1 \leq u \leq U$) is obtained by subtracting from a first soft estimate of said i-th symbol at least one term given by $\tilde{R}^u_{i,0} \cdot \hat{b}_i$, where $\tilde{R}^u_{i,0}$ is the u-th row of a matrix of size $U \times U$ whose diagonal components are zero and whose other components are respectively from a correlation matrix $\hat{R}_{i,0} = \hat{A}_i^* \cdot \hat{A}_i$, and $\hat{b}_i$ is a column vector of size U composed of decision values assigned to the i-th symbols of the U blocks, determined respectively from soft estimates obtained previously for said i-th symbols.

11. The receiving device as claimed in claim 10, wherein the processing means are arranged to obtain said corrected soft estimate of the i-th symbol of the block transmitted on the u-th channel by further subtracting from the first soft estimate of said i-th symbol at least one term of the form $\hat{R}^u_{i,j} \cdot \hat{b}_{i+j}$, where j is a non-zero integer, and $\hat{R}^u_{i,j}$ is the u-th row of a matrix of size $U \times U$ whose components are respectively from a correlation matrix $\hat{R}_{i,j} = \hat{A}_i^* \cdot \hat{A}_{i+j}$.

12. The receiving device as claimed in claim 11, wherein the processing means are arranged to obtain said corrected soft estimate of the i-th symbol of the block transmitted on the u-th channel by subtracting from the first soft estimate of said i-th symbol each of the terms of the form $\hat{R}^u_{i,j} \cdot \hat{b}_{i+j}$ for $-m \leq j \leq -1$ and $1 \leq j \leq m$, where m is the integer equal to or immediately greater than the number $(Q+W-1)/Q$.

13. The receiving device as claimed in claim 9, wherein the processing means are arranged to obtain corrected soft estimates sequentially for a plurality of symbols of the U blocks, and wherein each decision value assigned to a symbol transmitted on a channel is determined either from the first soft estimate of said symbol, if a corrected soft estimate of said symbol has not been obtained, or from the corrected soft estimate of said symbol.

14. The receiving device as claimed in claim 9, wherein the symbols are bits, the soft estimates are real numbers, and the decision values are determined from soft estimates obtained previously by applying a function increasing between −1 and +1 to said soft estimates.

15. The receiving device as claimed in claim 9, wherein the symbols are bit pairs, the soft estimates are complex numbers, and the decision values are determined from the soft estimates obtained previously by applying a function increasing between −1 and +1 to each of real and imaginary parts of said soft estimates.

16. The receiving device as claimed in claim 15, wherein said function increasing between −1 and +1 is the sign function.

17. The receiving device as claimed in claim 14, wherein said function increasing between −1 and +1 is the sign function.

18. The method as claimed in claim 6, wherein said function increasing between −1 and +1 is the sign function.

* * * * *

UNITED STATES PATENT AND TRADEMARK OFFICE
CERTIFICATE OF CORRECTION

PATENT NO. : 7,167,529 B2 Page 1 of 1
APPLICATION NO. : 10/312058
DATED : January 23, 2007
INVENTOR(S) : Hassan El Nahas El Homsi, Alexandre Jard and Moussa Abdi It is certified that error appears in the above-identified patent and that said Letters Patent is hereby corrected as shown below:

Column 9:
Line 7, "Z=Â*,Y" should read --Z=Â*.Y--;
Line 48, delete "blocks";

Signed and Sealed this

Seventeenth Day of November, 2009

David J. Kappos
*Director of the United States Patent and Trademark Office*